United States Patent
Kaku

(10) Patent No.: US 7,509,019 B2
(45) Date of Patent: Mar. 24, 2009

(54) CONTENTS EDITING APPARATUS WITH FREQUENCY ADJUSTMENT

(75) Inventor: Junya Kaku, Hyogo (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 765 days.

(21) Appl. No.: 10/527,086

(22) PCT Filed: Sep. 3, 2003

(86) PCT No.: PCT/JP03/11281

§ 371 (c)(1),
(2), (4) Date: Mar. 10, 2005

(87) PCT Pub. No.: WO2004/028154

PCT Pub. Date: Apr. 1, 2004

(65) Prior Publication Data

US 2006/0013561 A1    Jan. 19, 2006

(30) Foreign Application Priority Data

Sep. 19, 2002  (JP) ............................. 2002-272502

(51) Int. Cl.
*H04N 5/76* (2006.01)

(52) U.S. Cl. .................. 386/54; 715/203; 348/512

(58) Field of Classification Search .................. 386/89, 386/52, 54; 348/515, 512; 715/203, 723–728
See application file for complete search history.

(56) References Cited

U.S. PATENT DOCUMENTS 7,003,212 B1 * 2/2006 Murata et al. ................. 386/52
7,194,676 B2 * 3/2007 Fayan et al. .................. 715/203

FOREIGN PATENT DOCUMENTS

| JP | 04324777 | * 11/1992 |
| JP | 11-38954 | 2/1999 |
| JP | 2000-207875 | 7/2000 |
| JP | 2002-281443 | 9/2002 |

* cited by examiner

*Primary Examiner*—David E Harvey
(74) *Attorney, Agent, or Firm*—Kratz, Quintos & Hanson, LLP

(57) ABSTRACT

A content editing apparatus (10) includes a CPU (12). When combining JPEG data and audio data forming a moving file 1 with JPEG data and audio data forming a moving file 2, the CPU (12) calculates a reproduction frequency of combined audio data based on a sampling frequency of the audio data in the movie file 1 and a sampling frequency of the audio data in the movie file 2. The calculated sampling frequency is a frequency that makes it possible to complete simultaneously the reproduction of the combined JPEG data and the combined audio data. This sampling frequency is written into the combined file.

7 Claims, 17 Drawing Sheets

| |
|---|
| POSITION INFORMATION OF AUDIO DATA 0 |
| SIZE INFORMATION OF AUDIO DATA 0 |
| POSITION INFORMATION OF JPEG DATA 0 |
| SIZE INFORMATION OF JPEG DATA 0 |
| POSITION INFORMATION OF JPEG DATA 1 |
| SIZE INFORMATION OF JPEG DATA 1 |
| POSITION INFORMATION OF JPEG DATA 2 |
| SIZE INFORMATION OF JPEG DATA 2 |
| POSITION INFORMATION OF AUDIO DATA 1 |
| SIZE INFORMATION OF AUDIO DATA 1 |
| POSITION INFORMATION OF JPEG DATA 3 |
| SIZE INFORMATION OF JPEG DATA 3 |
| POSITION INFORMATION OF JPEG DATA 4 |
| SIZE INFORMATION OF JPEG DATA 4 |
| POSITION INFORMATION OF JPEG DATA 5 |
| SIZE INFORMATION OF JPEG DATA 5 |
| ⋮ |
| POSITION INFORMATION OF JPEG DATA n-1 |
| SIZE INFORMATION OF JPEG DATA n-1 |
| POSITION INFORMATION OF JPEG DATA n |
| SIZE INFORMATION OF JPEG DATA n |
| |

| i | SDRAM ADDRESS | DATA SIZE |
|---|---|---|
| 0 | | |
| 1 | | |
| 2 | | |
| 3 | | |
| 4 | | |
| 5 | | |
| ⋮ | ⋮ | ⋮ |

FIG. 5(A)

| POSITION INFORMATION OF JPEG DATA P |
|---|
| SIZE INFORMATION OF JPEG DATA P |

FIG. 5(B)

| | |
|---|---|
| POSITION INFORMATION OF JPEG DATA P | |
| SIZE INFORMATION OF JPEG DATA P | |
| POSITION INFORMATION OF JPEG DATA P | ONE FRAME INTERPOLATION |
| SIZE INFORMATION OF JPEG DATA P | |

FIG. 5(C)

| POSITION INFORMATION OF JPEG DATA P |
|---|
| SIZE INFORMATION OF JPEG DATA P |
| POSITION INFORMATION OF JPEG DATA P |
| SIZE INFORMATION OF JPEG DATA P |
| POSITION INFORMATION OF JPEG DATA P+1 |
| SIZE INFORMATION OF JPEG DATA P+1 |

FIG. 6(A)

| i | SDRAM ADDRESS | DATA SIZE |
|---|---|---|
| P | P-TH FRAME | P-TH FRAME |
| P+1 | | |
| P+2 | | |

FIG. 6(B)

| i | SDRAM ADDRESS | DATA SIZE |
|---|---|---|
| P | P-TH FRAME | P-TH FRAME |
| P+1 | P-TH FRAME | P-TH FRAME |
| P+2 | | |

} ONE FRAME INTERPOLATION

FIG. 6(C)

| i | SDRAM ADDRESS | DATA SIZE |
|---|---|---|
| P | P-TH FRAME | P-TH FRAME |
| P+1 | P-TH FRAME | P-TH FRAME |
| P+2 | P+1-TH FRAME | P+1-TH FRAME |

FIG. 7(A)

| |
|---|
| POSITION INFORMATION OF JPEG DATA P |
| SIZE INFORMATION OF JPEG DATA P |
| POSITION INFORMATION OF JPEG DATA P+1 |
| SIZE INFORMATION OF JPEG DATA P+1 |

FIG. 7(B)

| | |
|---|---|
| POSITION INFORMATION OF JPEG DATA P | |
| SIZE INFORMATION OF JPEG DATA P | |
| POSITION INFORMATION OF JPEG DATA P+2 | ONE FRAME THINNING |
| SIZE INFORMATION OF JPEG DATA P+2 | |

FIG. 7(C)

| |
|---|
| POSITION INFORMATION OF JPEG DATA P |
| SIZE INFORMATION OF JPEG DATA P |
| POSITION INFORMATION OF JPEG DATA P+2 |
| SIZE INFORMATION OF JPEG DATA P+2 |
| POSITION INFORMATION OF JPEG DATA P+3 |
| SIZE INFORMATION OF JPEG DATA P+3 |

FIG. 8(A)

| i | SDRAM ADDRESS | DATA SIZE |
|---|---|---|
| P | P-TH FRAME | P-TH FRAME |
| P+1 | P+1-TH FRAME | P+1-TH FRAME |
| P+2 | | |

FIG. 8(B)

| i | SDRAM ADDRESS | DATA SIZE |
|---|---|---|
| P | P-TH FRAME | P-TH FRAME |
| P+1 | P+2-TH FRAME | P+2-TH FRAME |
| P+2 | | |

} ONE FRAME THINNING

FIG. 8(C)

| i | SDRAM ADDRESS | DATA SIZE |
|---|---|---|
| P | P-TH FRAME | P-TH FRAME |
| P+1 | P+2-TH FRAME | P+2-TH FRAME |
| P+2 | P+3-TH FRAME | P+3-TH FRAME |

CONTENTS EDITING APPARATUS WITH FREQUENCY ADJUSTMENT

TECHNICAL FIELD

The present invention relates to a content combining apparatus. More specifically, the present invention relates to a content editing apparatus that is applied to digital video cameras or hard disk video recorders recording TV programs, and that generates a combined content by combining a first moving image signal and a first audio signal forming a first recorded content with a second moving image signal and a second audio signal forming a second recorded content, respectively.

PRIOR ART

One example of such a kind of conventional content editing apparatus is disclosed in Japanese Patent Laying-open No. 2000-207875 laid-open on Jul. 28, 2000. According to this prior art, when a joint mode is selected, a moving image signal and an audio signal in one file are transferred to the other file by predetermined amount via an internal memory. Consequently, the moving image signal and the audio signal transferred from the one file are connected to the ends of a moving image signal and an audio signal contained in the other file, respectively. In other words, a combined file in which the two files are joined is generated.

However, in case there is a discrepancy between two files to be combined in a sampling frequency of the audio signal, if an audio signal in the combined file is reproduced in accordance with one of the sampling frequencies, the reproduction of the moving image signal and audio signal cannot be simultaneously finished. For example, in case the sampling frequency of the audio signal contained in the one file is 7,980 Hz and the sampling frequency of the audio signal contained in the other file is 8,040 Hz, if the audio signal in the combined file is reproduced at the frequency of 8,040 Hz, the reproduction of the audio signal is finished earlier than that of the moving image signal.

SUMMARY OF THE INVENTION

Therefore, it is a primary object of the present invention is to provide a content editing apparatus that makes it possible to simultaneously complete the reproduction of a combined moving image signal and a combined audio signal.

According to the present invention, a content editing apparatus for generating a combined content by combining a first moving image signal and a first audio signal forming a first recorded content with a second moving image signal and a second audio signal forming a second recorded content, respectively, comprises: an optimal reproduction frequency calculation means for calculating an optimal reproduction frequency for the combined audio signal at which the reproduction times of a combined moving image signal and a combined audio signal coincide with each other; and a frequency assignment means for assigning the optimal reproduction frequency to the combined content.

A combined content is generated by combining a first moving image signal and a first audio signal forming a first recorded content with a second moving image signal and second audio signal forming a second recorded content, respectively. The optimal reproduction frequency calculation means calculates an optimal reproduction frequency for the combined audio signal at which the reproduction times of a combined moving image signal and a combined audio signal coincide with each other. The frequency assignment means assigns the calculated optimal reproduction frequency to the combined content. By reproducing the combined audio signal according to the optimal reproduction frequency assigned to the combined content, the reproduction of the combined moving image signal and the combined audio signal are simultaneously completed.

Preferably, the optimal reproduction frequency calculation means calculates the optimal reproduction frequency based on a total size of the first audio signal and the second audio signal, and a total recorded time of the first moving image signal and the second moving image signal.

Also preferably, a first reproduction frequency for the first audio signal is detected by a first reproduction frequency detection means, and a first correlation value correlating with an amount of a discrepancy between the optimal reproduction frequency and the first reproduction frequency is calculated by a first correlation value calculation means. At this time, the number of screens of the first moving image signal is adjusted by a first number-of-screens adjustment means based on the first correlation value. If the discrepancy between the first reproduction frequency and the optimal reproduction frequency is large, it is impossible to establish synchronization between the moving image and audio during the reproduction thereof, although the reproduction of the moving image and audio can be completed simultaneously. By adjusting the number of screens of the first moving image signal based on the first correlation value correlating with the amount of the discrepancy, synchronization can be established between the reproduced moving image and audio in accordance with the first moving image signal.

For the adjustment by the first adjustment means, it is preferable that the number of screens of the first moving image signal is increased by an increasing means, and that the number of screens of the first moving image signal is decreased by a decreasing means. Any one of the increasing means and the decreasing means is activated by an activation means at a timing corresponding to the first correlation value. The activation means, for example, activates the increasing means when the first correlation value indicates a first polarity, and activates the decreasing means when the first correlation value indicates a second polarity.

It is further preferable that a plurality of still image signals forming the first moving image signal are temporarily stored in a memory and are read in an order according to process order information. At this time, the increasing means generates the process order information in such a manner that a specific screen of the still image signals is overlapped. The decreasing means generates the process order information in such a manner that the specific screen of the still image signals is omitted. As a consequence, an overlap/omission of the still image signals occurs in the combined content.

If index information on still image signals forming the first moving image signal is assigned to the combined content by an information assignment means, it is preferable that the increasing means interpolates index information on still image signals for specific frames, and that the decreasing means skips index information on still image signals for specific frames. When a moving image is reproduced in reference to the index information, an overlap/omission occurs in screens forming the reproduced moving image.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 3 is an illustrative view showing one example of a mapping state of an SDRAM;

FIG. 4 is an illustrative view showing one example of a configuration of an access information table;

FIG. 5(A) is an illustrative view showing one part of an index information generation process;

FIG. 5(B) is an illustrative view showing another part of the index information generation process;

FIG. 5(C) is an illustrative view showing the other part of the index information generation process;

FIG. 6(A) is an illustrative view showing one part of an access information table generation process;

FIG. 6(B) is an illustrative view showing another part of the access information table generation process;

FIG. 6(C) is an illustrative view showing the other part of the access information table generation process;

FIG. 7(A) is an illustrative view showing one part of the index information generation process;

FIG. 7(B) is an illustrative view showing another part of the index information generation process;

FIG. 7(C) is an illustrative view showing the other part of the index information generation process;

FIG. 8(A) is an illustrative view showing one part of the access information table generation process;

FIG. 8(B) is an illustrative view showing another part of the access information table generation process;

FIG. 8(C) is an illustrative view showing the other part of the access information table generation process;

BEST MODE FOR PRACTICING THE INVENTION

Figure 1:
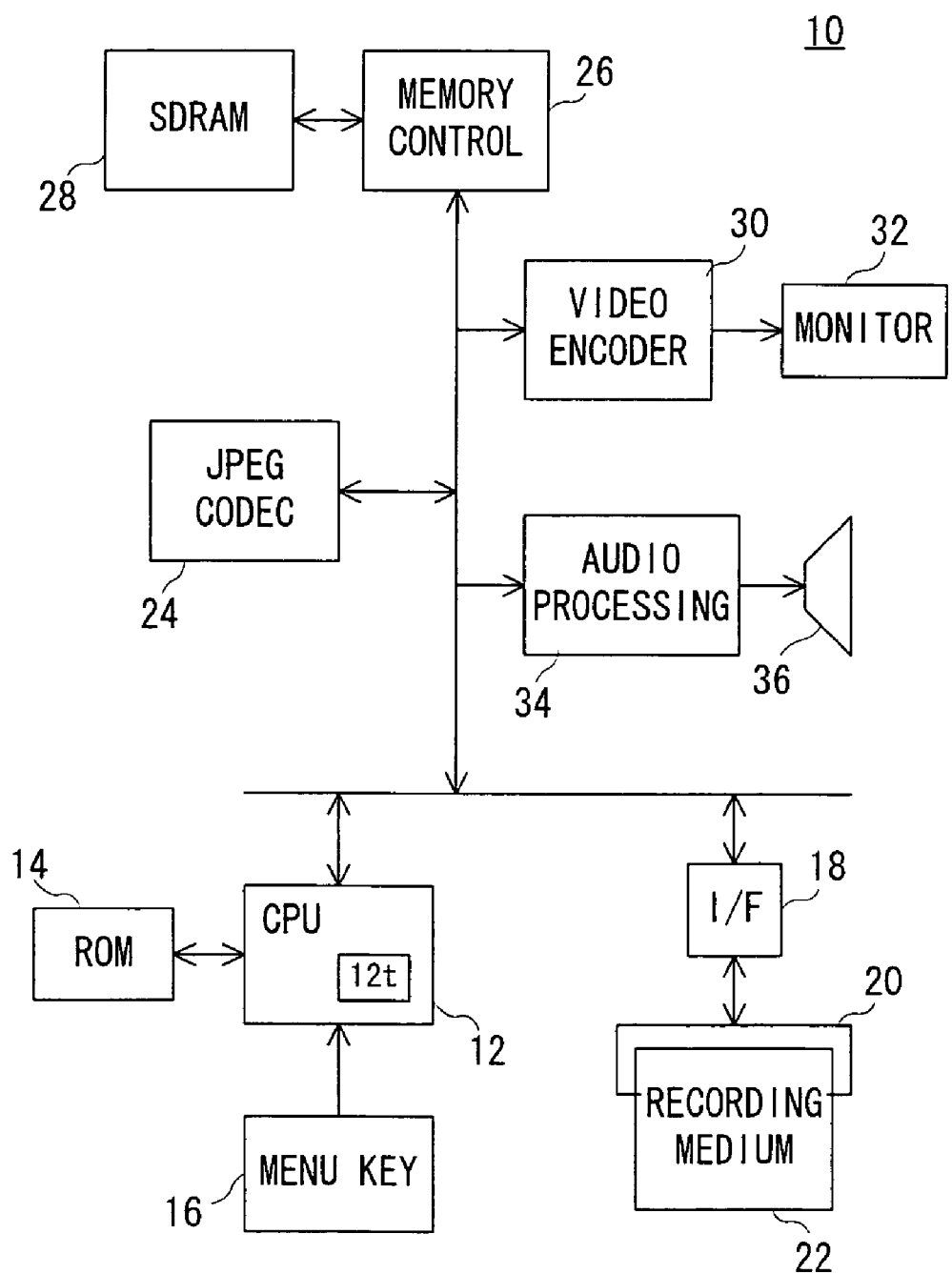
FIG. 1 is a block diagram showing one embodiment of the present invention.

Referring to FIG. 1, a content editing apparatus (digital video camera) 10 of this embodiment includes a CPU 12. When a file combining mode is selected by a menu key 16, a file combining process to join two movie files recorded on a recording medium 22 is carried out by the CPU 12. In the file combining process, JPEG data and audio data are read from two desired movie files, and the read JPEG data and audio data are transferred to an SDRAM 28 via an I/F circuit 18 and a memory control circuit 26. The JPEG data and audio data stored in the SDRAM 28 are then returned to the recording medium 22 via the memory control circuit 26 and the I/F circuit 18 so as to be written into a newly created movie file, i.e., a combined file.

It is noted that the recording medium 22 is detachable/attachable and can be accessed via the I/F circuit 18 when inserted into a slot 20.

Figure 2:
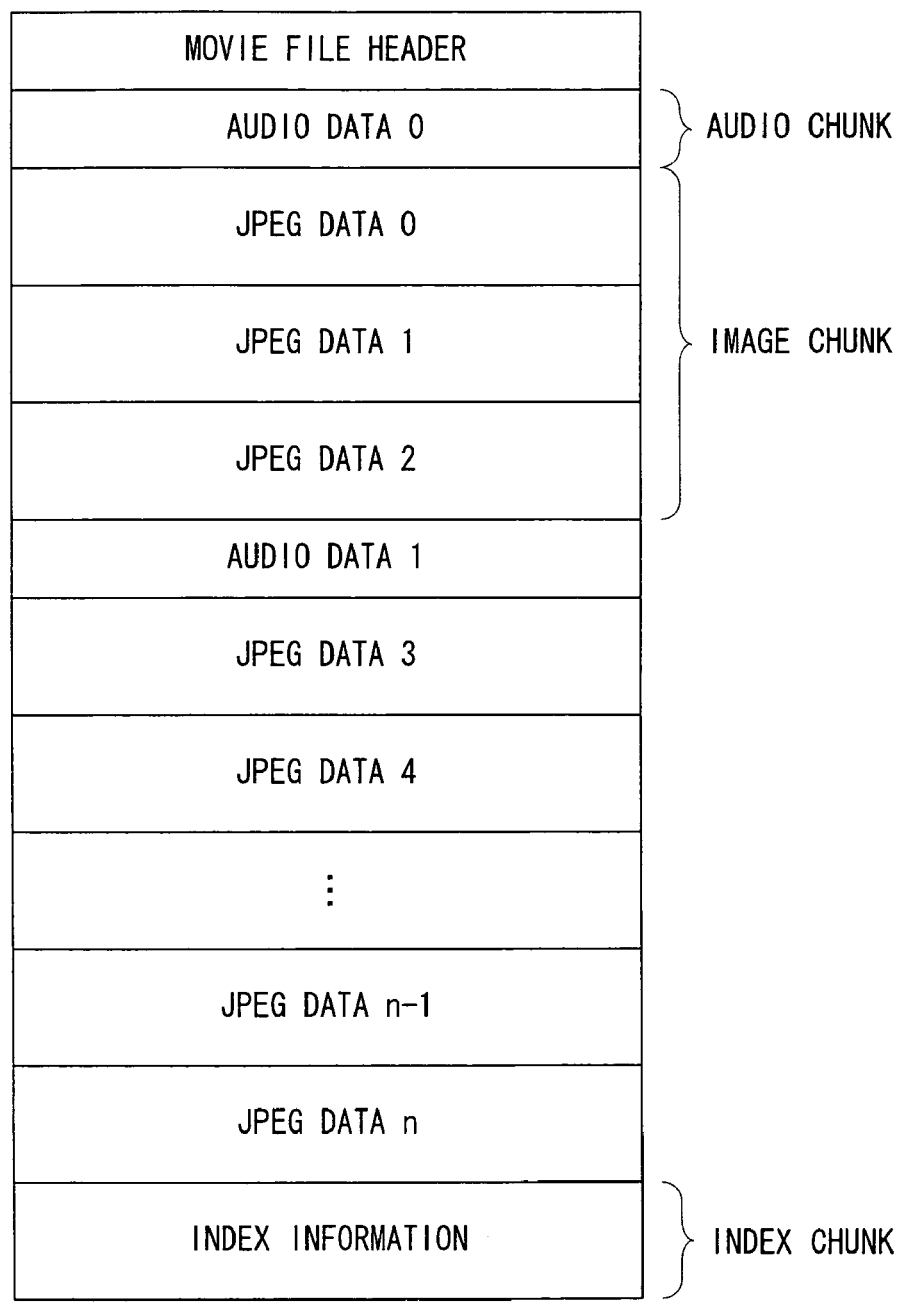
FIG. 2 is an illustrative view showing one example of structure of a movie file.

The movie file is configured as shown in FIG. 2 according to the QuickTime format. More specifically, a movie file header is arranged at the beginning of the file, audio chunks and image chunks are alternately arranged after the movie file header, and an index chunk is arranged at the end of the file. Each of the audio chunks is formed by audio data corresponding to three frames, and each of the image chunks is formed by three frames of JPEG data. Therefore, an audio chunk and an image chunk subsequent thereto relate to each other. The numbers 0, 1, 2, ... n assigned to respective frames of JPEG data shown in FIG. 2 are frame numbers. According to FIG. 2, n+1 frames of JPEG data are stored in the movie file.

Index information of the audio data and index information of the JPEG data are written into the index chunk. The index information of the audio data is composed of position information expressed by a distance from the beginning of the movie file to each audio chunk, and size information of each audio chunk. The index information of the JPEG data is composed of position information expressed by a distance from the beginning of the movie file to each frame of the JPEG data, and size information of each frame of the JPEG data. Thus, the audio data is managed chunk by chunk, and the JPEG data is managed frame by frame. In addition, what is written into the index chunk is the frame rate value and total number of frames of JPEG data stored in the movie file, and a sampling frequency of the audio data stored in the movie file, as control information.

The size of each audio chunk varies depending upon the performance of a digital video camera that has created the movie file header. For example, if the frame rate of an image sensor provided in the digital camera is 30 fps and the sampling frequency of an audio processing circuit provided in the digital camera is 7,980 Hz, the size of the audio data corresponding to one second (=30 frames) is 7,980 bytes and the size of the audio chunk is 798 bytes. If the frame rate of an image sensor provided in another digital video camera is 30 fps and the sampling frequency of an audio processing circuit provided in the digital video camera is 8,040 Hz, the size of the audio data corresponding to one second (=30 frames) is 8,040 bytes and the size of the audio chunk is 804 bytes. The recording medium 22 is detachable/attachable, and thus, taking note of a plurality of movie files recorded in the recording medium 22, the sizes of the audio chunk may be different among them.

In the file combining process, the control information, i.e., the frame rate and total number of frames of the JPEG data and the sampling frequency of the audio data, is firstly detected from two movie files 1 and 2 to be combined. Then, determined are the frame rate and total number of frames of the JPEG data to be stored in the combined file, and the sampling frequency at a time of reproducing the audio data to be stored in the combined file.

This embodiment assumes that JPEG data has a frame rate of 30 fps in both the movie files 1 and 2. Therefore, the frame rate of the JPEG data to be stored in the combined file is decided to be 30 fps as well. Also, the total number of frames of the JPEG data to be stored in the combined file is decided to be the sum of the total numbers of frames detected from the movie files 1 and 2. On the other hand, the sampling frequency at the time of reproducing the audio data to be stored in the combined file is defined as a frequency at which the reproduction of the JPEG data and audio data is simultaneously finished, based on the sampling frequencies detected from the movie files 1 and 2.

However, the larger the total number of frames in the combined file is, the wider a discrepancy between reproduced images and reproduced audio becomes. Thus, when the JPEG data in the movie file 1 is transferred to the combined file, a frame interpolation or a frame thinning is performed based on the amount of a discrepancy between the sampling frequency assigned to the movie file 1 and the sampling frequency determined for the combined file. Also, when the JPEG data in the movie file 2 is transferred to the combined file, a frame interpolation or a frame thinning is performed based on the amount of a discrepancy between the sampling frequency assigned to the movie file 2 and the sampling frequency determined for the combined file.

It is noted that variations in the number of frames occur during the file combining by execution of the frame interpolation/thinning. However, when the frame interpolation is performed on the JPEG data in the movie file 1, the frame thinning is carried out on the JPEG data in the movie file 2. When the frame thinning is performed on the JPEG data in the movie file 1, the frame interpolation is done on the JPEG data in the movie file 2. Consequently, the total number of frames of JPEG data to be stored in the combined file would not differ significantly from the total number of frames that has been determined at the start of the file combining.

Detailed descriptions of the frame interpolation/thinning are given below. The index information of the JPEG data and audio data to be stored in the combined file is generated on the SDRAM 26 in such a manner as shown in FIG. 3. In addition, access information of the JPEG data having been transferred to the SDRAM 26 from the movie file 1 or 2 within the recording medium 22 is generated on the access information table 12t shown in FIG. 4.

Figure 4:
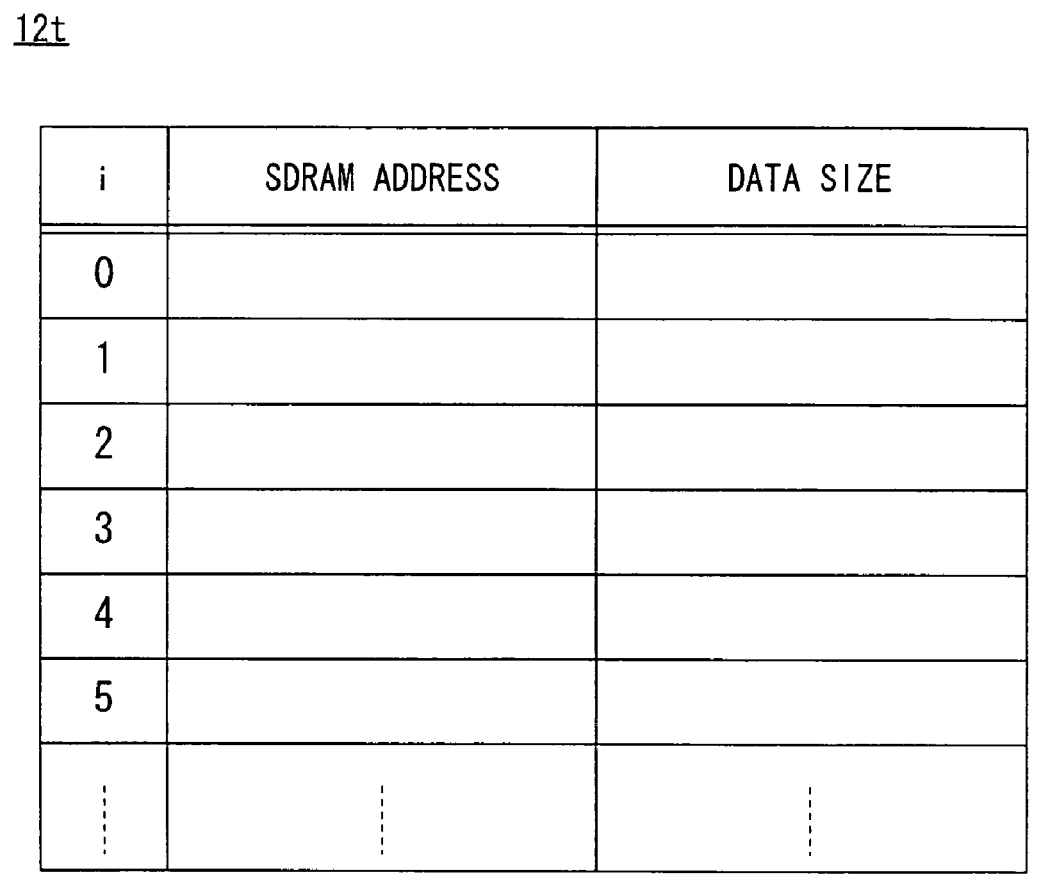

Referring to FIG. 3, the index information of the JPEG data generated on the SDRAM 26 includes position information expressed by a distance from the beginning of the combined file to each frame of the JPEG data, and size information of each frame of the JPEG data. The index information of the audio data generated on the SDRAM 26 includes position information expressed by a distance from the beginning of the combined file to each audio chunk, and size information of each audio chunk. Referring to FIG. 4, the access information includes address information showing the beginning address of the JPEG data stored in the SDRAM 26, and information showing the size of each frame of the JPEG data. In FIG. 4, a variable i is the frame number of the JPEG data to be written into the combined file. The frame interpolating/thinning process is performed on these index information and access information.

When the frame interpolating process is performed, the index information is generated on the SDRAM 26 in such a manner as shown in FIG. 5(A) to FIG. 5(C), and the access information is generated on the access information table 12t in such a manner as shown in FIG. 6(A) to FIG. 6(C).

According to FIG. 5(A), index information of JPEG data P is set in the SDRAM 26. If the frame interpolation is needed in this situation, index information of the same JPEG data P is successively set as shown in FIG. 5(B). After the index information of the JPEG data P has been interpolated in this way, index information of JPEG data P+1 is set in the SDRAM 26 as shown in FIG. 5(C).

Moreover, according to FIG. 6(A), access information of the JPEG data P is assigned to the variable i (=P). If the frame interpolation is needed in this situation, access information of the JPEG data P is assigned to the variable i (=P+1) as shown in FIG. 6(B). After the access information of the JPEG data P has been interpolated in this way, access information of JPEG data P+1 is assigned to the variable i (=P+2) as shown in FIG. 6(C).

When the frame thinning process is performed, the index information is generated on the SDRAM 26 in such a manner as shown in FIG. 7(A) to FIG. 7(C), and the access information is generated on the access information table 12t as shown in FIG. 8(A) to FIG. 8(C).

According to FIG. 7(A), index information of JPEG data P and index information of JPEG data P+1 are set in the SDRAM 26. If the frame thinning is needed in this situation, the index information of the JPEG data P+1 is overwritten by index information of JPEG data P+2 as shown in FIG. 7(B). This causes the index information of the JPEG data P+1 to be thinned out. Following the index information of the JPEG data P+2, index information of JPEG data P+3 is set as shown in FIG. 7(C).

Furthermore, according to FIG. 8(A), access information of the JPEG data P and access information of the JPEG data P+1 are configured in the access information table 52b. If the frame thinning is needed in this situation, the access information of the JPEG data P+1 is overwritten by access information of the JPEG data P+2 as shown in FIG. 8(B). This causes the access information of the JPEG data P+1 to be thinned out. Following the access information of the JPEG data P+2, access information of the JPEG data P+3 is set as shown in FIG. 8(C).

The JPEG data stored in the SDRAM 26 is read out in reference to the access information table 12t, and then is written into the combined file. Each frame of the JPEG data is sequentially transferred from the movie file 1 or 2 to the SDRAM 26. However, if the frame interpolation is performed on the access information, a specific frame of the JPEG data is transferred two consecutive times from the SDRAM 26 to the combined file. If the frame thinning is performed on the access information, the reading of a specific frame of the JPEG data is canceled. As a result of this, some partial overlaps or losses occur in the JPEG data to be stored in the combined file. Since the frame interpolation/thinning is performed on the index information as well as the frame interpolation/thinning on the access information, no discrepancy occurs between the JPEG data and the index information stored in the combined file.

It is noted that transfer of the JPEG data from the movie file 1 or 2 to the SDRAM 26 is basically carried out by three frames. In the intervals of the JPEG data transferring process by three frames, the audio data corresponding to three frames is transferred from the movie file 1 or 2 to the SDRAM 26. When three frames of the JPEG data and the audio data corresponding to three frames has been retained in the SDRAM 26, these data are transferred all together to the combined file. One audio chunk and one image chunk are formed in the combined file.

When the transfer of the JPEG data and audio data to the combined file is completed, the index chunk containing the control information (frame rate, total number of frames, and sampling frequency) determined at the start of the file combining process and the index information generated on the SDRAM 26 are stored into the end of the combined file. This completes the combined file.

When the reproduction of a desired movie file (including a combined file) is ordered by the operation of the menu key 16, a file reproducing process is executed by the CPU 12. Firstly, the control information is detected from the index chunk of the desired movie file, and the sampling frequency contained in the control information is assigned to the audio processing circuit 34. Then, the JPEG data and the audio data stored in the desired movie file are read out by predetermined amounts on the basis of the index information so as to be written into the SDRAM 28 via the memory control circuit 26.

A JPEG codec 24 reads each frame of the JPEG data stored in the SDRAM 28 through the memory control circuit 26, and performs JPEG-decompression on the read JPEG data. The decompressed image data is written into the SDRAM 28 through the memory control circuit 26, and then supplied to a video encoder 30 through the memory control circuit 26. The video encoder 30 converts the supplied image data into a composite video signal, and supplies the converted composite video signal to a monitor 32. As a consequence, a reproduced moving image is displayed on a screen.

The audio processing circuit 34 reads the audio data stored in the SDRAM 28 through the memory control circuit 26, and converts the read audio data into an analog audio signal according to the sampling frequency determined at a time of starting the reproduction. The converted analog audio signal is output from a speaker 36.

Figure 17:
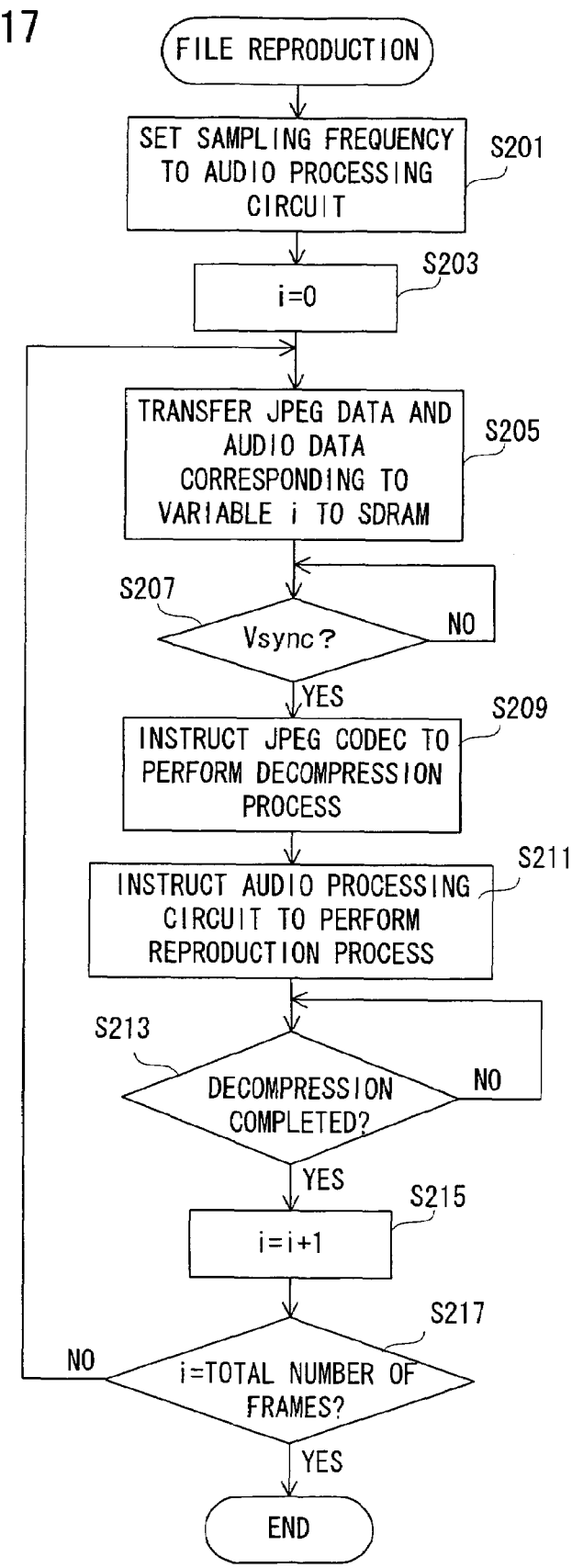
FIG. 17 is a flowchart showing one part of the operation of the CPU in file reproducing.

More specifically, the CPU 12 performs the file combining according to the flowcharts shown in detail in FIG. 9 to FIG. 16, and performs the file reproduction according to the flowchart shown in FIG. 17. It is noted that a control program corresponding to these flowcharts are stored in a ROM 14.

Figure 9:
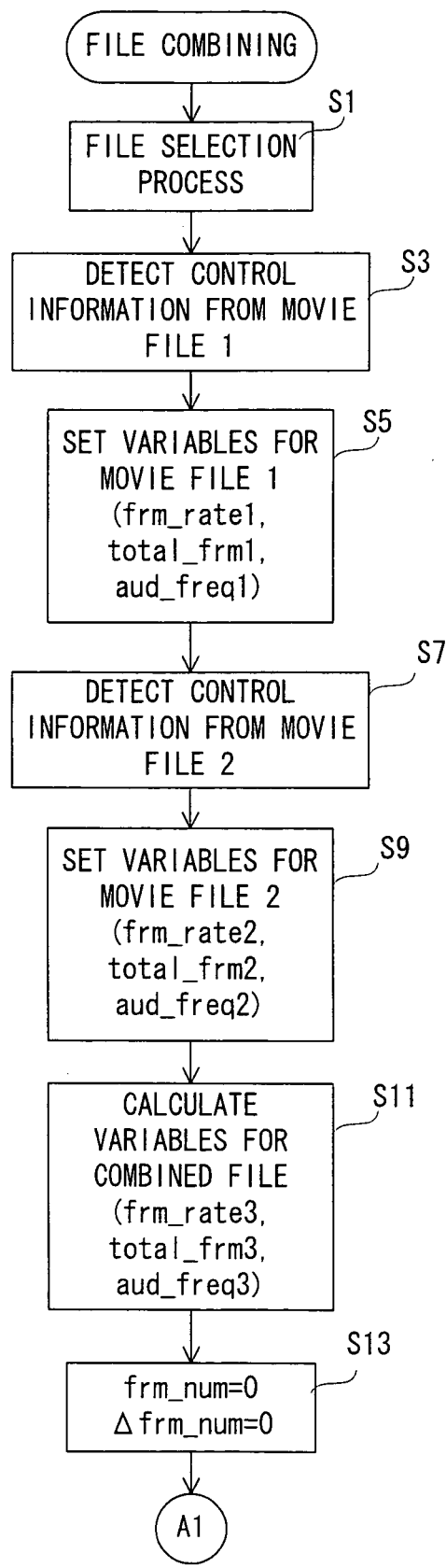
FIG. 9 is a flowchart showing one part of an operation of a CPU in file combining.
Figure 10:
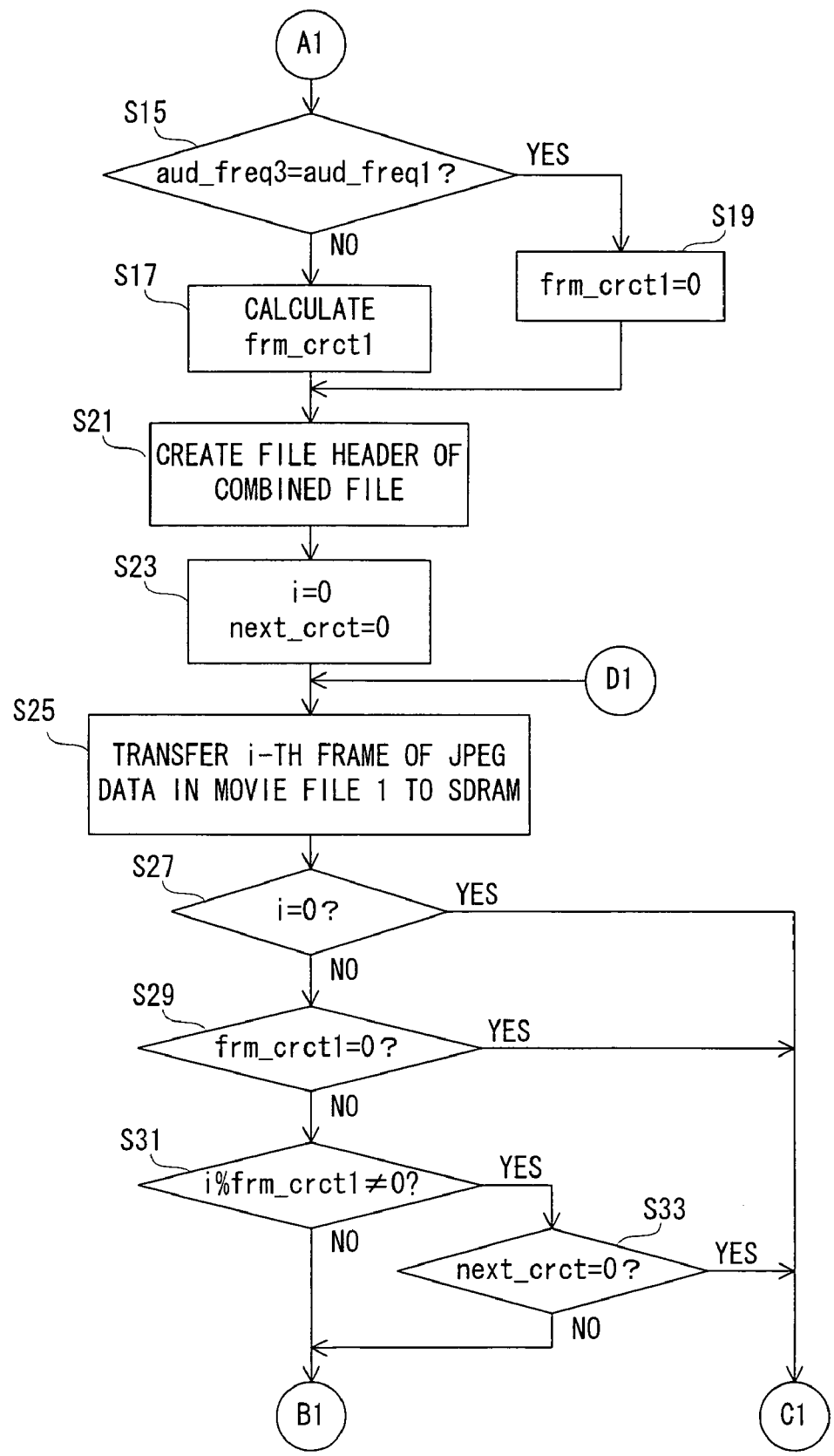
FIG. 10 is a flowchart showing another part of the operation of the CPU in file combining.
Figure 11:
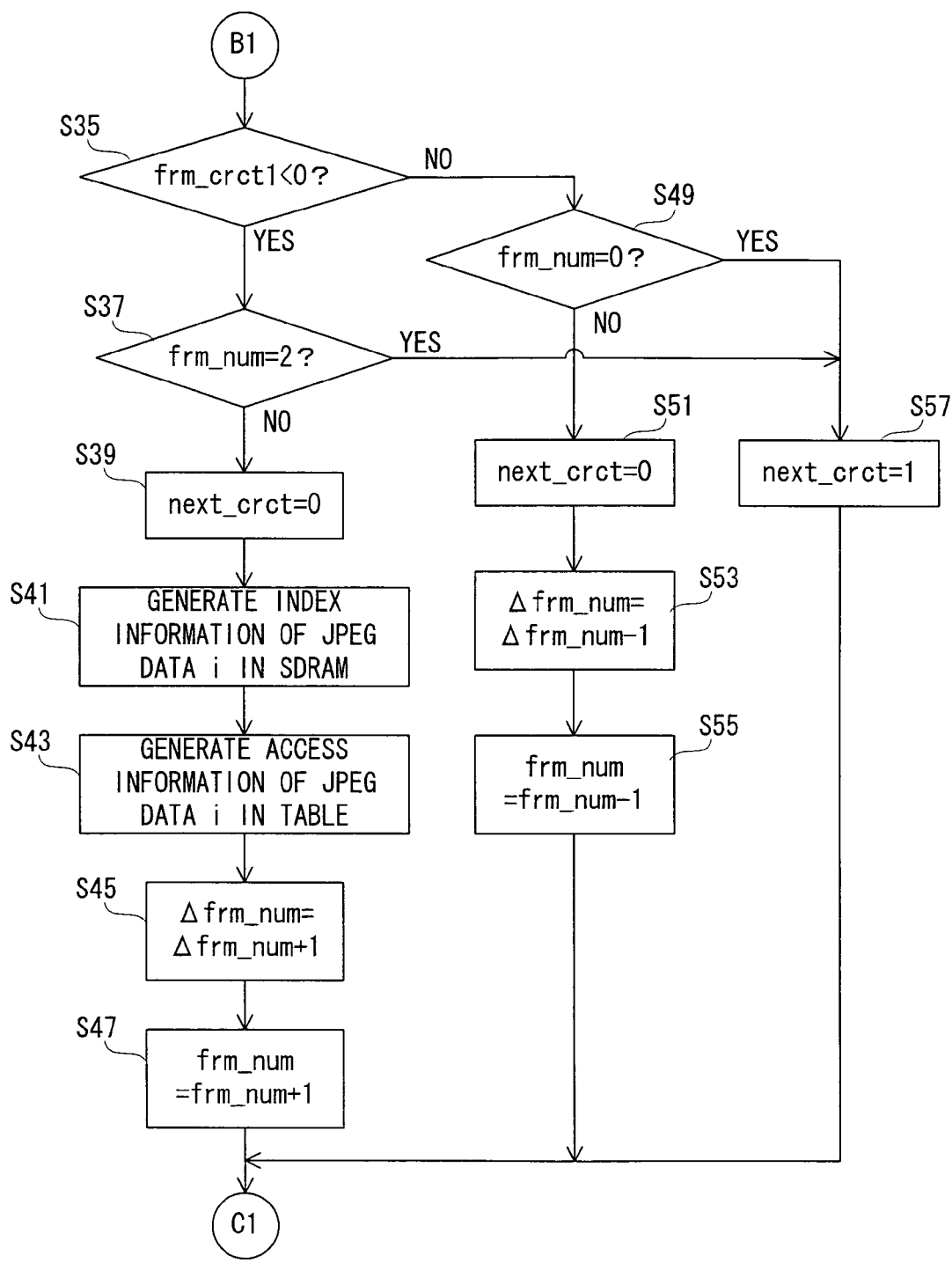
FIG. 11 is a flowchart showing the other part of the operation of the CPU in file combining.
Figure 12:
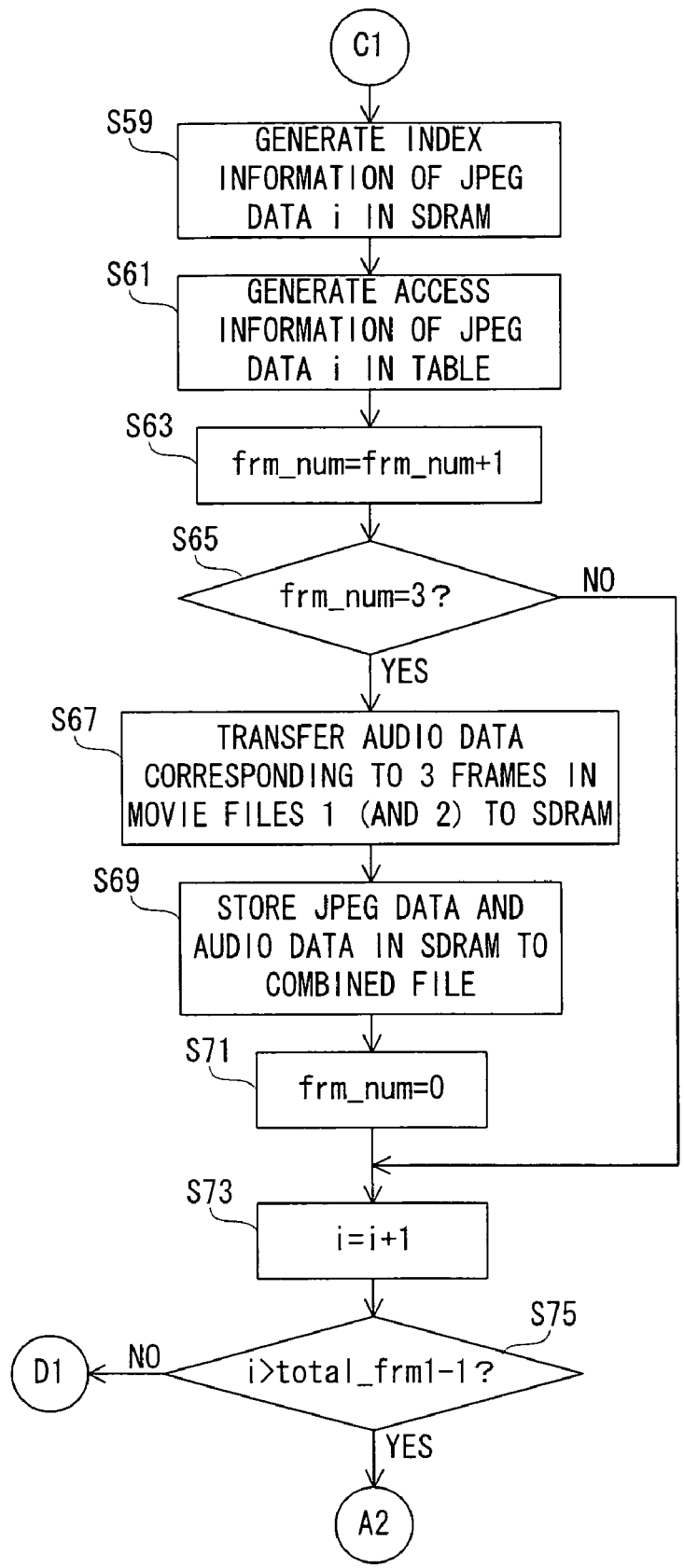
FIG. 12 is a flowchart showing further part of the operation of the CPU in file combining.
Figure 13:
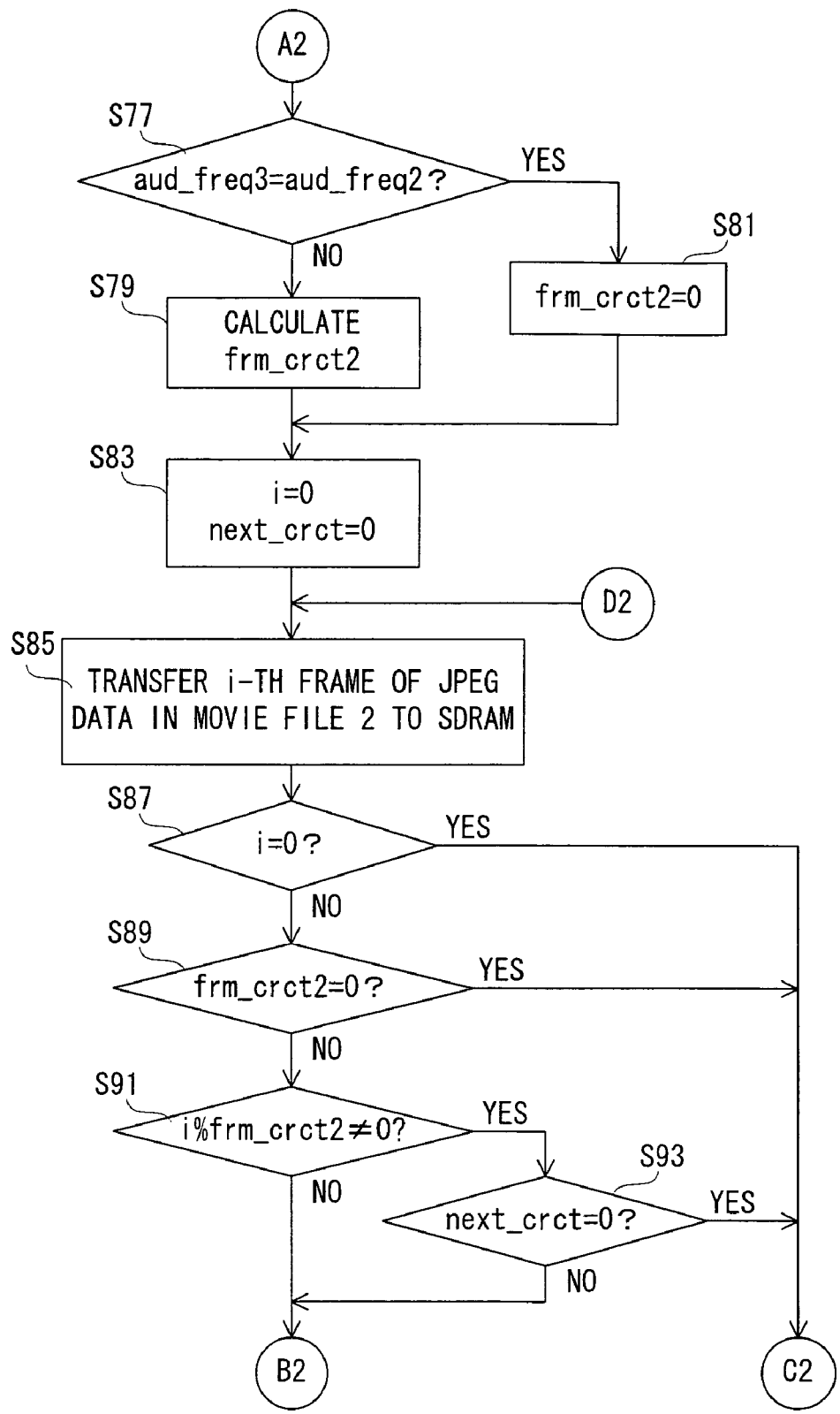
FIG. 13 is a flowchart showing another part of the operation of the CPU in file combining.
Figure 14:
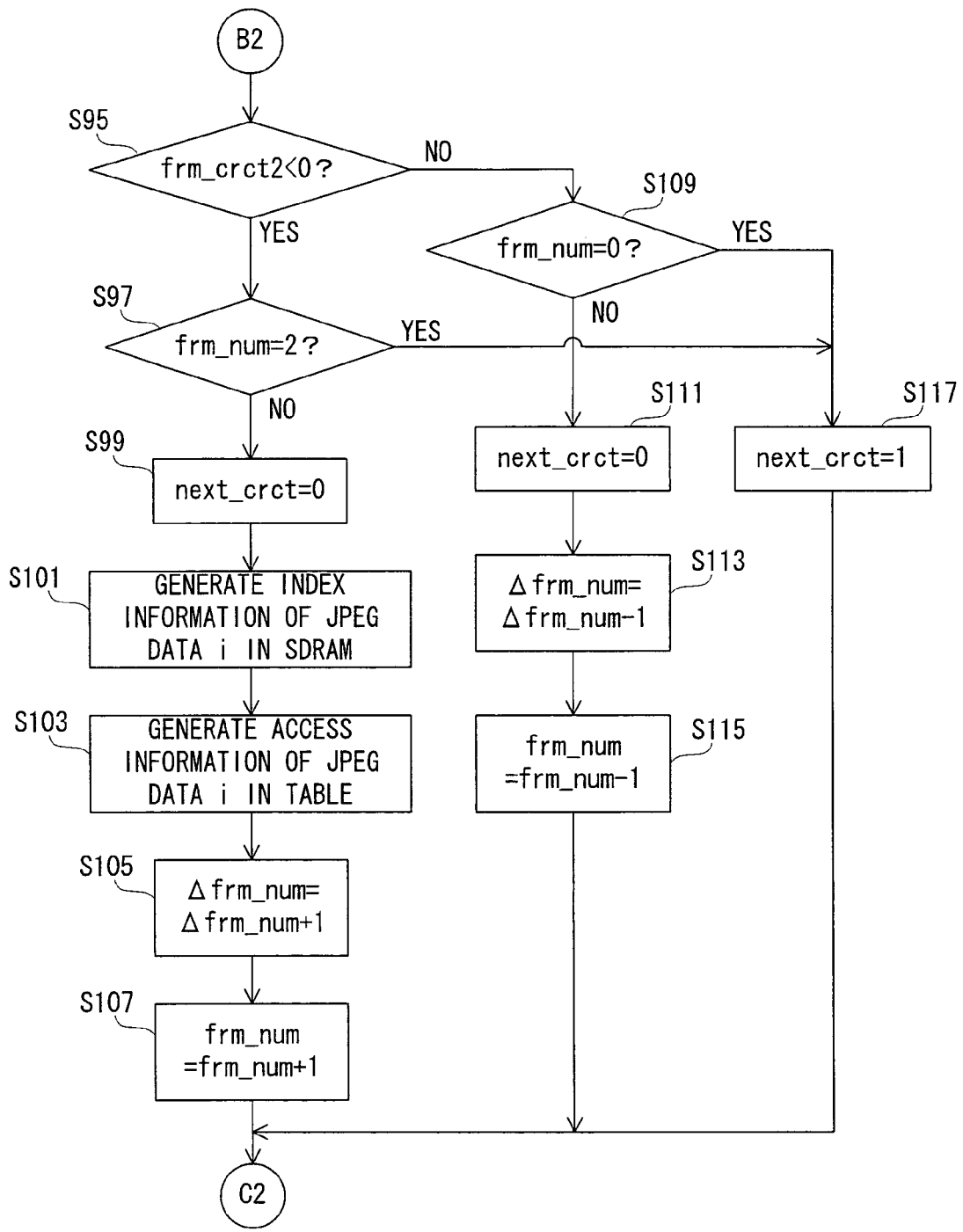
FIG. 14 is a flowchart showing the other part of the operation of the CPU in file combining.
Figure 15:
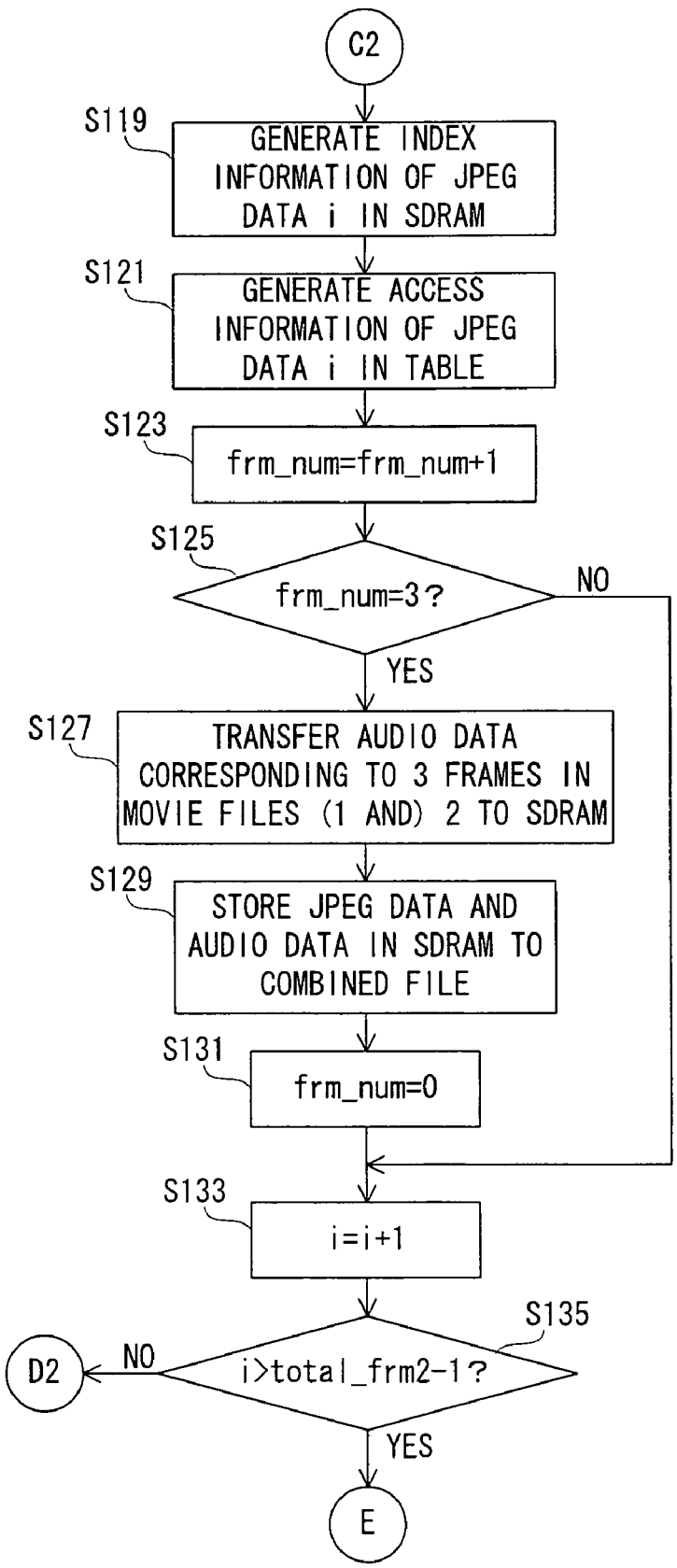
FIG. 15 is a flowchart showing further part of the operation of the CPU in file combining.
Figure 16:
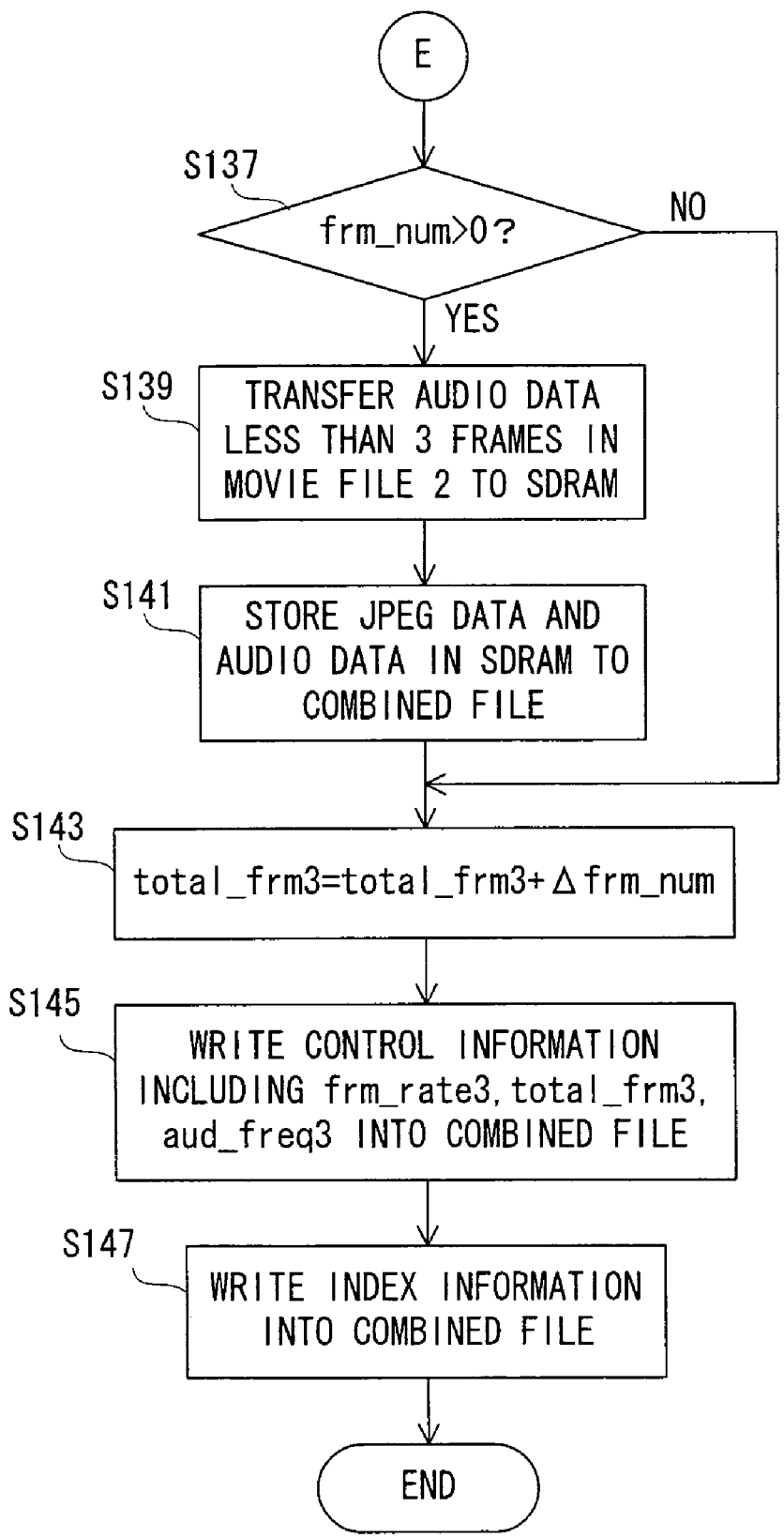
FIG. 16 is a flowchart showing another part of the operation of the CPU in file combining.

Regarding the file combining, the CPU 12 firstly performs a file selection process in a step S1 shown in FIG. 9. Thus, the two movie files 1 and 2 to be combined are selected.

The CPU 12 detects the control information from the index chunk of the movie file 1 in a step S3, and sets various variables based on the detected control information in a step S5. The detected control information includes the frame rate and total number of frames of the JPEG data, and the sampling frequency of the audio data. The frame rate is defined as a variable frm_rate1, the total number of frames is defined as a variable total_frm1, and the sampling frequency is defined as a variable aud_freq1.

In steps S7 and S9, the CPU 12 performs the same operations on the movie file 2 as those in the steps S3 and S5. That is, the CPU 12 detects the control information on the movie file 2 in the step S7, and sets various variables based on the detected control information in the step S9. The frame rate of the JPEG data contained in the movie file 2 is defined as a variable frm_rate2, the total number of frames of the JPEG data contained in the movie file 2 is defined as a variable total_frm2, and the sampling frequency of the audio data contained in the movie file 2 is defined as a variable aud_freq2.

In a step S11, the CPU 12 calculates variables frm_rate3 and total_frm3 in accordance with the equation 1 and equation 2, and calculates a variable aud_freq3 in accordance with the equation 3 to equation 6. Here, the variables frm_rate 3 and total_frm3 denote the frame rate and total number of frames of the JPEG data to be stored in the combined file, respectively. The variable aud_freq3 denotes the sampling frequency for reproducing audio data to be stored in the combined file.

frm_rate3=frm_rate1 [Equation 1]

total_frm3=total_frm1+total_frm2 [Equation 2]

aud_sz1=aud_freq1*total_frm1/frm_rate1 [Equation 3]

aud_sz2=aud_freq2*total_frm2/frm_rate2 [Equation 4]

frm_sec=total_frm3/frm_rate3 [Equation 5]

aud_freq3=(aud_sz1+aud_sz2)/frm_sec [Equation 6]

According to the equation 1, the variable form_rate1 is defined as the variable frm_rate3. The frame rate of the JPEG data coincides between the movie file 1 and the movie file 2, and thus either the variable frm_rate1 or frm_rate2 can be defined as the variable frm_rate3.

In the equation 2, the variables total_frm1 and total_frm2 are added together. This determines the total number of frames of JPEG data to be stored in the combined file.

The size aud_sz1 of audio data stored in the movie file 1 is obtained by the equation 3, the size aud_sz2 of audio data stored in the movie file 2 is found by the equation 4, and the time frm_sec required for reproducing the JPEG data to be stored in the combined file is determined by the equation 5. According to the equation 6, the combined size of audio data (=aud_sz1+aud_sz2) is divided by the time frm_sec. The frequency obtained by the division operation is the sampling frequency of the audio data which makes it possible to simultaneously complete the reproduction of the JPEG data and audio data stored in the combined file.

For example, if the frame rate and total number of frames of the JPEG data stored in the movie file 1 are 30 fps and 54,000 frames (=1,800 seconds), respectively, and the sampling frequency of the audio data stored in the movie file 1 is 7,980 Hz, then the variable frm_rate1 is set to "30", the variable total_frm1 is set to "54,000" and the variable aud_freq1 is set to "7,980".

Also, if the frame rate and total number of frames of the JPEG data stored in the movie file 2 are 30 fps and 108,000 frames (=3,600 seconds), respectively, and the sampling frequency of the audio data stored in the movie file 2 is 8,040 Hz, then the variable frm_rate1 is set to "30", the variable total_frm1 to "108,000" and the variable aud_freq1 to "8,040".

In this case, the variables related to the combined file, form_rate3, total_form3 and aud_freq3 are set to "30", "162,000" and "8,020", respectively. More specifically, the frame rate and total number of frames of the JPEG data to be stored in the combined file are decided to be 30 fps and 162,000 frames (=5,400 seconds), respectively, and the sampling frequency of the audio data to be stored in the combined file is decided to be 8,020 Hz.

In a step S13, the CPU 12 assigns "0" to variables frm_num and Δfrm_num. The variable frm_num is for specifying what position of the SDRAM 28 a noticed frame of the JPEG data should be written to. This variable is updated among "0" to "3", but the actually significant values are "0," "1" and "2". The variable Δfrm_num is a variable showing a fluctuation margin of the number of frames due to the frame interpolation/thinning.

In a step S15, the CPU 12 determines whether the variables aud_freq3 and aud_freq1 agree with each other. If the result is YES, the CPU 12 assigns "0" to the variable frm_crct1 and then proceeds to a step S21. If NO, the CPU 12 calculates the variable frm_crct1 according to the equation 7 and equation 8, and then moves on to the step S21.

frmnum_rep1=(aud_sz1/aud_freq3)*frm_rate3 [Equation 7]

frm_crct1=total_frm1/(total_frm1−frmnum_rep1) [Equation 8]

The variable frmnum_rep1 obtained by the equation 7 denotes the number of frames required to simultaneously complete the reproduction of the audio data and JPEG data when the audio data stored in the movie file 1 is reproduced at the sampling frequency according to the variable aud_freq3. In the equation 8, the variable frmnum_rep1 is subtracted from the variable total_frm1, and then the variable total_frm1 is divided by the value from the subtraction operation.

The variable frm_crct1 obtained in this way is a correlation value correlating with the amount of a discrepancy in sampling frequency between the movie files 1 and 3, and it specifies in what cycle, which operation to be performed, frame interpolation or frame thinning. The operation cycle is specified by the magnitude of the value of the variable frm_crct1, and which to be performed, frame interpolation or frame thinning, is specified by the polarity of the value. It is noted that the negative polarity corresponds to the frame interpolation, and the positive polarity corresponds to the frame thinning.

If the variables frm_rate1, total_frm1, aud_freq1, frm_rate2, total_frm2 and aud_freq2 adopt the above described values, the variable frm_crct1 is decided to be "200" (all the fractions below decimal point are dropped). In this case, the frame thinning is performed once every 200 frames.

The CPU 12 creates a file header of the combined file in a step S21, and assigns "0" to the variables i and next_crct in a step S23. The variable i is for specifying the JPEG data stored in the movie file 1 or 2 as described above. The variable next_crct is for determining whether or not the frame interpolation/thinning process is in a suspended state. When the process is suspended, the variable next_crct takes on "1".

In a step S25, the CPU 12 transfers an i-th frame of the JPEG data stored in the movie file 1 to the SDRAM 28. More specifically, the CPU 12 accesses the recording medium 22 through the I/F circuit 18, detects the i-th frame of the JPEG data from the movie file 1, and then writes the detected JPEG data into the SDRAM 28 through the memory control circuit 26. The written position is determined by the variable frm_num.

The CPU 12 identifies the value of the variable i in a step S27, the value of the variable frm_crct1 in a step S29, the value of the remainder (=i % frm_crct1) when the variable i is divided by the variable form_crct1 in a step S31, and the value of the variable next_crct in a step S33.

Here, if the variable i is "0", if the variable frm_crct1 is "0", or if the remainder i % frm_crct1 is other than "0" and the variable next_crct is "0", the CPU 12 determines that the current frame is not a frame to be subject to the frame interpolation/thinning process, and then proceeds to a step S59. On the contrary, if both the variables i and frm_crct1 are other than "0" and the remainder i % frm_crct is "0", or if the variables i and frm_crct1 and the remainder i % frm_crct1 are all other than "0" and the variable next_crct is "1", the CPU 12 determines that the current frame is a frame to be subject to the frame interpolation/thinning process, and goes on to a step S35.

In the step S35, the CPU 12 determines whether or not the value of the variable frm_crct1 is less than "0". If YES here, that is, if the variable frm_crct1 is of negative polarity, the CPU 12 determines that the frame interpolating process is necessary and then moves to a step S37. If NO, that is, if the variable frm_crct1 is of positive polarity, the CPU 12 determines that the frame thinning process is required and then proceeds to a step S49.

In the step S37, the CPU 12 compares the value of the variable frm_num to "2", and, if frm_num=2, the CPU 12 assigns "1" to the variable next_crct in a step S57 and then moves on to the step S59. As explained above, three frames of JPEG data forms one image chunk in a movie file, and JPEG data transferred to the SDRAM 28 is written chunk by chunk into the combined file. On the other hand, frm_num=2 denotes that three frames of the JPEG data have been already stored in the SDRAM 26, and that the frame interpolating process cannot be performed at this time. Thus, the CPU 12 assigns "1" to the variable next_crct in order to suspend the frame interpolating process in a step S57. The frame interpolating process will be performed on the next frame.

Contrary thereto, if the variable frm_num is "0" or "1", the CPU 12 proceeds to a step S39 so as to execute the frame interpolating process. In the step S39, the CPU 12 firstly assigns "0" to the variable next_crct. In other words, since the frame interpolating process is carried out from now, the CPU 12 returns the variable next_crct to "0" in order to cancel the suspended state.

In a succeeding step S41, the CPU 12 generates index information of the i-th frame of the JPEG data into the SDRAM 28. As mentioned above, in the index chunk of the movie file, the position and size of the JPEG data on the file are managed frame by frame. Thus, in the step S41, the CPU 12 generates position information and size information of one frame of the JPEG data as the index information. In addition, since three frames of the JPEG data form one image chunk, the CPU 12 specifies on which of three consecutive frames the current frame falls, by the variable frm_num, thereby determining in which position of the SDRAM 26 the index information is to be generated. If the step S41 has been performed in a state where the index information is mapped as shown in FIG. 5(A), the mapping state changes from FIG. 5(A) to FIG. 5(B).

In a step S43, the CPU 12 generates access information of the i-th frame of the JPEG data into the access information table 12*t* shown in FIG. 4. More specifically, the CPU 12 generates beginning address information and size information of the i-th frame of the JPEG data existing in the SDRAM 26, as the access information, and sets the generated access information in the access information table 12*t*. At this time as well, the CPU 12 specifies a writing destination of the access information based on the variable frm_num. If the step S43 has been performed in a state where the access information is configured as shown in FIG. 6(A), the configured state changes from FIG. 6(A) to FIG. 6(B).

When the process in the step S43 is completed, the CPU 12 increments the variable Δfrm_num in a step S45, increments the variable frm_num in a step S47, and then moves on to a step S59.

If the frame thinning process is required, the CPU 12 moves from the step S35 to the step S49 so as to determine whether or not the variable frm_num is "0". If frm_num=0 is determined here, the CPU 12 sets the variable next_crct to "1" in a step S57. As aforesaid, the variable frm_num can be updated only among "0" to "3". On the other hand, according to the frame thinning process, the variable frm_num is decremented in a step S55. Hereupon, if the frame thinning process is attempted in the state of frm_num=0, the process will be broken down. Therefore, when frm_num=0 is determined, the CPU 12 sets the variable next_crct to "1" in the step S57 so as to suspend the frame thinning process. The frame thinning process will be performed on the next frame.

On the other hand, if the variable frm_num is "1" or "2", the CPU 12 proceeds to a step S51 to perform the frame thinning process. The CPU 12 sets the variable next_crct to "0" in the step S51, and decrements the variables Δfrm_num and frm_num in steps S53 and S55. With the decrement of the variable frm_num, the index information is overwritten in the next index information generating process, and the access information is overwritten in the next access information generating process. Therefore, when the index information mapped as shown in FIG. 7(A) has been overwritten, the mapping state changes from FIG. 7 to FIG. 7(B). When the access information configured as shown in FIG. 8(A) has been overwritten, the configured state changes from FIG. 8(A) to FIG. 8(B).

In steps S59 to S63, the CPU 12 executes the same processes as those in the steps S41 to S45, and then compares the variable frm_num to "3" in a succeeding step S65. Here if the variable frm_num is "1" or "2", the CPU 12 moves straight to a step S73. If the variable frm_num is "3", the CPU 12 proceeds to the step S73 through steps S67 to S71.

In the step S67, the CPU 12 transfers the audio data corresponding to three frames stored in the movie files 1 (and 2) to the SDRAM 26. More specifically, the CPU 12 identifies three frames of the audio data that corresponds to the JPEG data stored at this time in the SDRAM 26, reads the identified audio data from the recording medium 22 via the I/F circuit 18, and then writes the read audio data into the SDRAM 28 through the memory control circuit 26.

If the sampling frequency of the audio data obtained with regard to the combined file is 8,020 Hz, the size of the audio data corresponding to three frames to be read from the movie file 1 becomes 802 bytes. If the sampling frequency of the audio data stored in the movie file 1 is different from that of the combined file, reading of the audio data is performed across two audio chunks. In addition, these two audio chunks may be identified from the movie files 1 and 2, respectively.

In a step S69, the CPU 12 transfers the JPEG data and audio data retained in the SDRAM 26 to the combined file. More specifically, the CPU 12 reads three frames of the JPEG data and the audio data corresponding to three frames from the SDRAM 28 through the memory control circuit 26. Then the CPU 12 writes the read data into the combined file within the recording medium 22 via the I/F circuit 18. Especially, the JPEG data is read from the SDRAM 28 in reference to the access information table 12t. Therefore, one audio chunk and one image chunk are formed in the combined file. When the frame interpolating process has been performed in the steps S37 to S47, there occurs an overlap of the JPEG data in the image chunk. When the frame thinning process has been executed in the steps S51 to S55, there occurs a loss of the JPEG data in the image chunk.

When the process in the step S69 is completed, the CPU 12 sets the variable frm_num to "0" in the step S71.

The CPU 12 increments the variable i in the step S73, and compares the updated variable i to "total_frm1-1" in a succeeding step S75. If the variable i is "total_frm1-1" or less, the CPU 12 determines that the reading of data from the movie file 1 has not yet been completed, and returns to the step S25. On the contrary, if the variable i exceeds "total_frm1-1", the CPU 12 determines that the reading of the JPEG data from the movie file 1 has been completed, and proceeds to step S77.

In steps S77 to S135, the CPU 12 transfers data located at the end of the movie file 1 to the combined file if required, and also transfers data in the movie file 2 to the combined file. However, the steps S77 to S81 are about the same as the steps S15 to S19 described above and steps S83 to S135 are about the same as the steps S21 to S75 described above. Thus, duplicate description is omitted hereafter as much as possible.

The CPU 12 compares the variable aud_freq3 to the variable aud_freq2 in the step S77, and defines the variable frm_crct 2 in the step S79 or S81 depending upon the comparison result. Especially, in the step S79, the CPU 12 calculates the variable frm_crct2 according to the equation 9 and equation 10.

$$\text{frmnum\_rep2}=(\text{aud\_sz2}/\text{aud\_freq3})*\text{frm\_rate3} \qquad \text{[Equation 9]}$$

$$\text{frm\_crct2}=\text{total\_frm2}/(\text{total\_frm2}-\text{frmnum\_rep2}) \qquad \text{[Equation 10]}$$

If the variables frm_rate1, total_frm1, aud_freq1, frm_rate2, total_frm2 and aud_freq2 take on the above-mentioned values, the variable form_crct2 is determined to be "−401". In this case, the frame interpolation is performed once every 401 frames.

In a step S85, the CPU 12 transfers an i-th frame of the JPEG data stored in the movie file 2 to the SDRAM 28. Additionally, the CPU 12 identifies the value of the variable frm_crct2 in a step S89, and identifies the value of the remainder ($=i\%\text{frm\_crct2}$) when the variable i has been divided by the variable frm_crct2, in a step S91. Moreover, the CPU 12 determines whether or not the variable frm_crct2 is less than "0" in a step S95.

In a step S127, the CPU 12 transfers the audio data corresponding to three frames stored in the movie files (1 and) 2 to the SDRAM 26. At this time as well, the reading of the audio data may be performed across two audio chunks depending on the sampling frequency, and also these two audio chunks may be specified from the movie files 1 and 2, respectively. In a step S135, the CPU 12 compares the variable i to "total_frm2-1". If YES is determined in the step S135, the CPU 12 assumes that the reading of the JPEG data from the movie file 2 has been completed, and moves to the process in a step S137 and later.

In the step S137, the CPU 12 compares the variable frm_num to "0". If frm_num=0, the CPU 12 goes straight to a step S143. If frm_num>0, the CPU 12 proceeds to the step S143 through steps S139 to S141. The CPU 12 transfers the audio data less than the equivalent of three frames, located at the end of the movie file 2, to the SDRAM 28 in the step S139. Then, the CPU 12 stores in the combined file the JPEG data less than three frames and the audio data less than the equivalent of three frames which are retained in the SDRAM 28. This completes the transfer of the JPEG data and audio data from the movie files 1 and 2 to the combined file.

In the step S143, the CPU 12 executes the operation of the equation 11 in order to update the variable total_form3.

$$\text{total\_frm3}=\text{total\_frm3}+\Delta\text{form\_num} \qquad \text{[Equation 11]}$$

Since the total number of frames of the JPEG data stored in the combined file may vary due to the frame interpolating/thinning process, the variable $\Delta\text{frm\_num}$ is added to the variable total_frm3 by the execution of the equation 11.

In a step S145, The CPU 12 writes the control information, including the frame rate according to the variable frm_rate3, the total number of frames according to the variable total_fram3 and the sampling frequency according to the variable aud_freq3, into the combined file. In a step S147, the CPU 12 writes the index information generated on the SDRAM 28 into the combined file. As a result of this, an index chunk is formed at the end of the combined file, which brings the combined file to completion.

When a desired movie file is selected by an operator for the purpose of file reproduction, the CPU 12 executes a file reproduction process shown in FIG. 17.

Firstly, in a step S201, the CPU 12 detects the control information from the desired movie file so as to assign the sampling frequency contained in the detected control information to the audio processing circuit 34. The CPU 12 sets the variable i to "0" in a step S203, and transfers the JPEG data and the audio data corresponding to the variable i, into the SDRAM 28 in a step S205. The JPEG data and audio data are read from the desired movie file, and written into the SDRAM 28 via the memory control circuit 26.

In a step S207, the CPU 12 determines whether a vertical synchronizing signal is generated from a TG (timing generator) not illustrated. If YES, the CPU 12 proceeds to a step S209. The vertical synchronizing signal is generated at a rate of once every 1/30 second, and the processes in the step S209 and later steps are performed every 1/30 second.

The CPU 12 instructs the JPEG codec 24 to execute a decompression process in the step S209, and instructs the audio processing circuit 34 to execute a reproduction process in a step S211.

The JPEG codec 24 reads one frame of the JPEG data stored in the SDRAM 28 through the memory control circuit 26, and executes the decompression process on the read JPEG data. The decompressed image data is written into the SDRAM 28 through the memory control circuit 26, and then supplied to the video encoder 30 through the memory control circuit 26. The video encoder 30 converts the supplied image data into the composite video signal, and provides the converted composite video signal to the monitor 32. As a consequence, a reproduced image is displayed on the screen.

The audio processing circuit 34 reads the audio data stored in the SDRAM 28 through the memory control circuit 26, and converts the read audio data into an analog audio signal according to the sampling frequency assigned in the step S201. The converted analog audio signal is output from the speaker 36.

In a step S213, the CPU 12 determines whether the decompression process of the JPEG codec 24 is completed. If YES, the CPU 12 increments the variable i in a step S215 and moves on to a step S217. In the step S217, the CPU 12 compares the updated variable i to the total number of frames of the JPEG data stored in the desired movie file. If i<the total number of frames, the CPU 12 returns to the step S205. Thus, the processes in the steps S205 to S217 are repeatedly executed until all the frames of the JPEG data are reproduced.

As understood from the above description, a combined file (combined content) is generated by combining the JPEG data and audio data forming the movie file 1 (first content) with the JPEG data and audio data forming the second file 2 (second content), respectively. The sampling frequency for reproducing the combined audio data stored in the combined file is calculated in the step S11. This frequency is an optimal reproduction frequency at which reproduction times of the combined JPEG data and combined audio data stored in the combined file coincide with each other, and it is written into the combined file in the step S145.

Therefore, by reproducing the combined audio data according to the sampling frequency calculated in the step S11, the reproduction of the combined JPEG data and combined audio data is simultaneously completed.

However, if there is a large discrepancy between the sampling frequency assigned to the combined file and the sampling frequency assigned to the movie file 1 or 2, although it is possible to simultaneously finish the reproduction of the image data and audio data, an unignorable discrepancy occurs between the image and the audio during reproduction thereof.

Thus, in this embodiment, a correlation value correlating with an amount of the discrepancy between the sampling frequency assigned to the movie file 1 and the sampling frequency calculated for the combined file, i.e., the variable frm_crct1 is calculated in the step S17. Also, a correlation value correlating with an amount of the discrepancy between the sampling frequency assigned to the movie file 2 and the sampling frequency calculated for the combined file, i.e., the variable frm_crct2 is calculated in the step S79. The number of frames of the JPEG data read from the movie file 1 is adjusted based on the variable frm_crct1, and the number of frames of the JPEG data read from the movie file 2 is adjusted based on the variable frm_crct2. This makes it possible to reduce the discrepancy between the reproduced image and the reproduced audio.

The number of frames of the JPEG data is adjusted by interpolating/thinning the access information and interpolating/thinning the index information. Since the access information is used for controlling the reading of the JPEG data transferred to the SDRAM 28, the number of frames of the JPEG data is adjusted at a time of storage into the combined file by the interpolation/thinning of the access information. In addition, since the index information is used for controlling the reproduction of the combined file, the number of frames of the JPEG data is adjusted at a time of reproduction by the interpolation/thinning of the index information.

It is noted that, although movie files in the QuickTime format are combined in this embodiment, the present invention can be also applied to movie files in the MPEG format as well.

Additionally, although a thinning/interpolation is performed on both the access information and the index information in this embodiment, the thinning/interpolation may be performed only on the index information unless consideration is given to the QuickTime format. Therefore, it is possible to prevent the JPEG data from being omitted due to the thinning process of the access information.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A content editing apparatus for generating a combined content by combining a first moving image signal and a first audio signal forming a first content with a second moving image signal and a second audio signal forming a second content, respectively, comprising:

an optimal reproduction frequency calculation means for calculating an optimal reproduction frequency at which reproduction times of a combined moving image signal and a combined audio signal forming said combined content coincide with each other for said combined audio signal; and a frequency assignment means for assigning said optimal reproduction frequency to said combined content;

a first reproduction frequency detection means for detecting a first reproduction frequency of said first audio signal;

a first correlation value calculation means for calculating a first correlation value correlating with an amount of a discrepancy between said optimal reproduction frequency and said first reproduction frequency; and a first number-of-screens adjustment means for adjusting the number of screens of said first moving image signal based on said first correlation value.

2. A content editing apparatus according to claim 1, wherein said optimal reproduction frequency calculation means calculates said optimal reproduction frequency based on a total size of said first audio signal and said second audio signal, and a total recorded time of said first moving image signal and said second moving image signal.

3. A content editing apparatus according to claim 1, wherein said first adjustment means includes an increasing means for increasing the number of screens of said first moving image signal, a decreasing means for decreasing the number of screens of said first moving image signal, and an activation means for activating any one of said increasing means and said decreasing means at a timing corresponding to said first correlation value.

4. A content editing apparatus according to claim 3, wherein said activation means activates said increasing means when said first correlation value indicates a first polarity, and activates said decreasing means when said first correlation value indicates a second polarity.

5. A content editing apparatus according to claim 3, further comprising:
- a memory for temporarily storing a plurality of still image signals forming said first moving image signal; and
- a reading means for reading the still image signals stored in said memory in an order according to process order information, wherein
- said increasing means generates said process order information in such a manner that a specific screen of the still image signals is overlapped; and
- said decreasing means generates said process order information in such a manner that the specific screen of the still image signals is omitted.

6. A content editing apparatus according to claim 3, further comprising
- an information assignment means for assigning index information of still image signals forming said first moving image signal to said combined content, wherein
- said increasing means performs an interpolation on the index information of a specific screen of the still image signals; and
- said decreasing means performs a thinning on the index information of the specific screen of the still image signals.

7. A content editing apparatus according to claim 1, further comprising:
- a second reproduction frequency detection means for detecting a second reproduction frequency of said second audio signal;
- a second correlation value calculation means for calculating a second correlation value correlating with an amount of a discrepancy between said optimal reproduction frequency and said second reproduction frequency; and
- a second number-of-screens adjustment means for adjusting the number of screens of said second moving image signal based on said second correlation value.

* * * * *